Nov. 8, 1960

J. M. URITIS 2,959,334

WEB DRIVE MEANS

Filed May 3, 1954

INVENTOR.

JOSEPH M. URITIS

BY Morris Lakkin

ATTORNEY

United States Patent Office 2,959,334

Patented Nov. 8, 1960

2,959,334

WEB DRIVE MEANS

Joseph M. Uritis, Haddonfield, N.J., assignor to Radio Corporation of America, a corporation of Delaware Filed May 3, 1954, Ser. No. 427,172

6 Claims. (Cl. 226—176)

This invention relates to web driving systems and more particularly to a rapid start-stop drive means for web-like members.

In reeling systems, particularly of the type used in high speed computing apparatus, there is a need for means for rapidly starting and stopping the advancement of a web member. This web member may be in the form of a magnetic record tape. In many operations of a computing device using such records, it is essential that the record member be aperiodically started and stopped with considerable accuracy, particularly in the start time and, with a minimum time consumed in accelerating the record member from a stationary condition to a full speed condition which may, for example, be on the order of 100" per second.

It is an object of the present invention to provide means for accurately and rapidly starting the advancement of a web-like member.

It is a further object of the present invention to provide means as set forth wherein substantially the only inertia to be overcome is the inertia of the web member itself.

These and further objects have been accomplished in accordance with the present invention by providing a constantly rotating capstan partially about which the web member is loosely wrapped. A pressure roller is positioned adjacent the capstan and includes a main body portion and a pair of raised end portions. The raised end portions engage the capstan, straddling the web member wrapped partially thereabout. Whenever the capstan is rotated, the pressure roller is similarly rotated. However, the main body portion does not engage the web member and, accordingly, the web member slips on the capstan. When it is desired to advance the web member, the axis of the pressure roller is shifted toward the capstan, deforming the raised end portions and pinching the web member between the capstan and pressure roller. Since the pressure roller constantly rotates with the capstan, the only inertia to be overcome, in causing the tape to advance, is the relatively insignificant inertia of the tape itself.

An understanding of the invention may be had from the following detailed description when considered in connection with the accompanying drawing in which.

Figures 2, 3, 4:
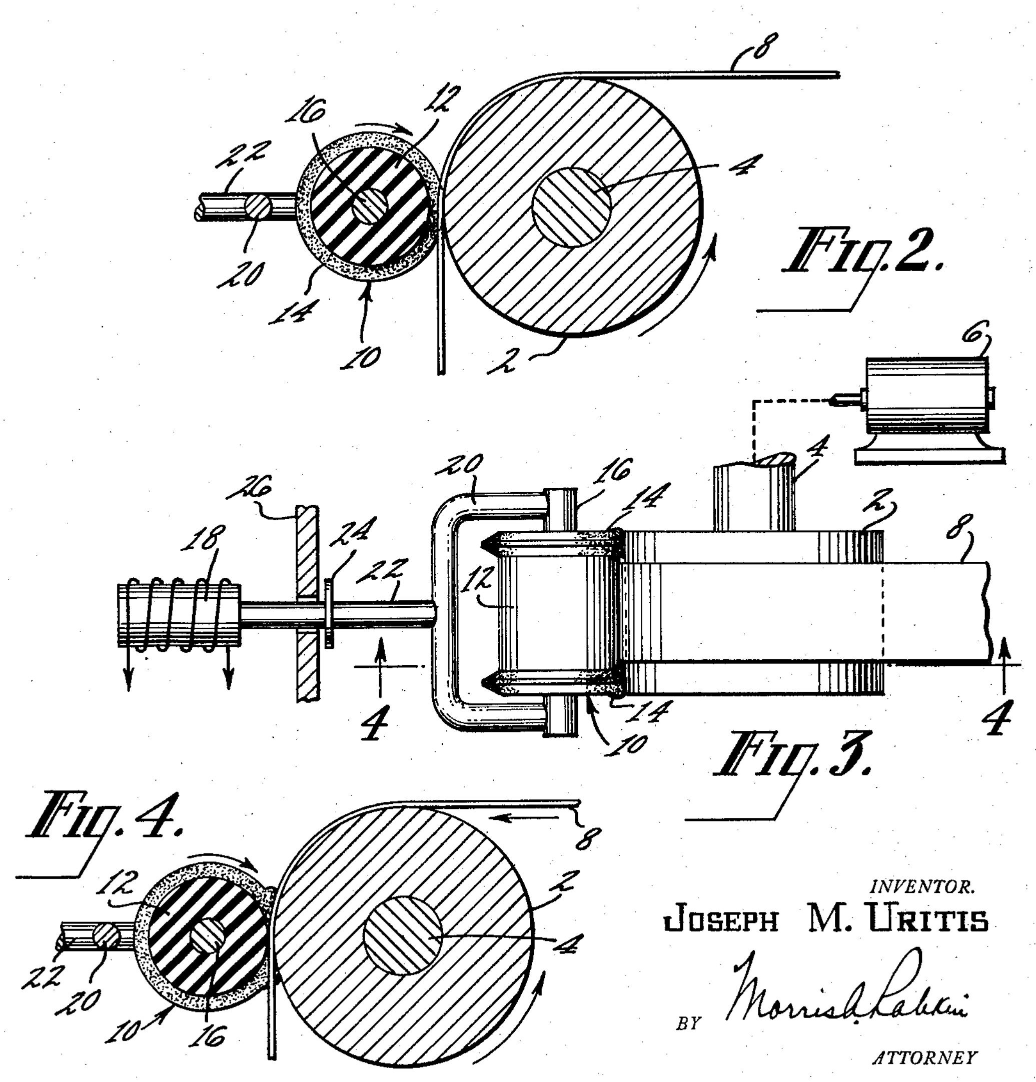
Fig. 2 is a fragmentary cross-sectional view of the apparatus shown in Fig. 1, the section being taken along the line 2—2 of Fig. 1 as viewed in the direction of the arrows.
Fig. 3 is a view similar to that shown in Fig. 1 but showing the apparatus in tape advancing position; and, Fig. 4 is a fragmentary cross-sectional view of the apparatus shown in Fig. 3, the section being taken along the line 4—4 of Fig. 3 as viewed in the direction of the arrows.

Referring now to the drawing in more detail, there is shown a capstan 2 which is mounted on a shaft 4 and is driven at suitable desired speed, through suitable coupling, by a motor 6 (Fig. 3). A web member 8 which may, for example, be a magnetic record member is entrained loosely about the capstan 2. A pressure roller 10 comprises a generally cylindrical body portion 12 and a pair of raised end portions or rims 14. The rims 14 are preferably made of a relatively soft, easily deformable, resilient material such, for example, as soft rubber. The body portion 12 may be made, for example, of relatively harder rubber or the like. The pressure roller 10 is rotatably mounted on suitable shaft means 16 and is positioned adjacent to the capstan 2 with the two rims 14 in frictional driving engagement with the capstan 2. Thereby the pressure roller 10 is driven at normal or desired operating speed by the capstan 2 whenever the capstan itself is so driven.

Figure 1:
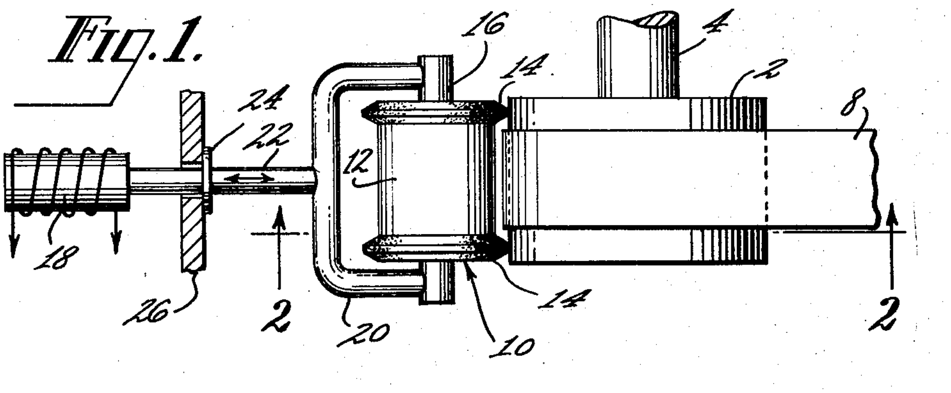
Fig. 1 is a plan view of apparatus involving the present invention and showing the apparatus in condition to allow the tape to remain stationary.

In the positions shown in Figs. 1 and 2, the rims 14 of the pressure roller 10 lightly engage the capstan 2. However, the body portion 12 of the roller 10 is spaced sufficiently far from the surface of the capstan 2 to permit the web member 8 to pass freely between the capstan 2 and that body portion 12. Means are provided for shifting the axis of the pressure roller 10 toward and away from the capstan 2. Such shifting means is represented schematically in the drawing as a solenoid 18 which when energized shifts the axis of the roller 10 toward the capstan 2 through a yoke 20 applying pressure to the shaft 16. When the solenoid 18 is not energized, the resilience of the rims 14 on the pressure roller 10 applies sufficient spring bias to maintain the body portion 12 of the roller 10 out of engagement with the web member 8. However, to assure that the rims 14 remain in driving contact with the capstan 2, stop means are provided to limit the travel of the yoke 20 under the influence of the rims 14. This stop means is schematically represented by an enlarged portion 24 on the shaft 22 of the yoke 20 which engages or abuts a stationary member such as a suitable panel means 26.

When the solenoid 18 is energized, the axis of the roller 10 is shifted toward the capstan 2 and the rims 14 are compressed. This shifting of the axis brings the cylindrical body portion 12 of the roller 10 into engagement with the surface of the web member 8 passing between the roller 10 and the capstan 2. The pressure thus exerted on the web member 8 by the two rotating bodies causes the web member 8 to be substantially instantaneously advanced at the peripheral velocity of the capstan 2.

Thus, when it is desired to initiate the advancement of the web member 8, it is not necessary to first bring the capstan 2 and/or the pressure roller 10 up to operating velocity before the web member itself can be brought up to the desired operating velocity. The relatively massive members are already rotating at operating velocity.

What is claimed is:

1. In a web driving system of the type wherein a web member is to be driven discontinuously, a capstan, means for driving said capstan, a pressure roller positioned adjacent and parallel to said capstan, said pressure roller including a generally cylindrical body portion and a pair of resilient, spaced surrounding rims, said rims being spaced to straddle a web member, means for rotatably supporting said pressure roller with said rims in frictional driving contact with said capstan, said cylindrical body portion being slightly spaced from said capstan whereby to receive a web member loosely therebetween, and means for shifting said pressure roller toward said capstan whereby to deform said rims and pinch said web member between said capstan and said cylindrical body portion.

2. In a web driving system of the type wherein a web member is to be driven discontinuously, a capstan, means for driving said capstan, a pressure roller positioned adjacent and parallel to said capstan, said pressure roller including a generally cylindrical body portion and a pair of resilient, spaced surrounding rims, said rims being spaced to straddle a web member, means for rotatably supporting said pressure roller with said rims in frictional driving contact with said capstan, said cylindrical body portion being slightly spaced from said capstan whereby to receive a web member loosely therebetween, means for shifting said pressure roller toward said capstan whereby to deform said rims and pinch said web member between said capstan and said cylindrical body portion, and means for limiting displacement of said pressure roller with respect to said capstan.

3. In a web driving system of the type wherein a web member is to be driven discontinuously, a capstan, means for driving said capstan, a pressure roller positioned adjacent and parallel to said capstan, said pressure roller including a generally cylindrical and relatively hard body portion and a pair of resilient, relatively soft rims spaced from each other and surrounding said body portion, said rims being spaced to straddle a web member, means for rotatably supporting said pressure roller with said rims in frictional driving contact with said capstan, said cylindrical body portion being slightly spaced from said capstan whereby to receive a web member loosely therebetween, and means for shifting said pressure roller toward said capstan whereby to deform said rims and pinch said web member between said capstan and said cylindrical body portion.

4. In a web driving system of the type wherein a web member is to be driven discontinuously, a capstan, means for driving said capstan, a pressure roller positioned adjacent and parallel to said capstan, said pressure roller including a generally cylindrical and relatively hard rubber body portion and a pair of relatively soft rubber rims, said rims being spaced to straddle a web member, means for rotatably supporting said pressure roller with said rims in frictional driving contact with said capstan, said cylindrical body portion being slightly spaced from said capstan whereby to receive a web member loosely therebetween, and means for shifting said pressure roller toward said capstan whereby to deform said rims and pinch said web member between said capstan and said cylindrical body portion.

5. In a web driving system of the type wherein a web member is to be driven discontinuously, a capstan, means for driving said capstan, a pressure roller positioned adjacent and parallel to said capstan, said pressure roller including a generally cylindrical and relatively hard rubber body portion and a pair of relatively soft rubber rims, said rims being spaced to straddle a web member, means for rotatably supporting said pressure roller with said rims in frictional driving contact with said capstan, said cylindrical body portion being slightly spaced from said capstan whereby to receive a web member loosely therebetween, means for shifting said pressure roller toward said capstan whereby to deform said rims and pinch said web member between said capstan and said cylindrical body portion, and stop means to prevent said roller from moving away from said capstan to disengage said rims therefrom.

6. In a web driving system of the type wherein a web is to be driven discontinuously, a first rotary cylindrical member, means for driving said member, a second rotary cylindrical member positioned adjacent and parallel to said first rotary member, one of said members including a generally cylindrical body portion having a pair of spaced surrounding resilient portions, said resilient portions being spaced to straddle a web member, means for rotatably supporting said second rotary cylindrical member with said resilient portions on the one rotary member in frictional driving contact with the other rotary member, said cylindrical body portion being spaced from the first rotary member while the resilient portions on the one rotary member are in frictional driving contact with the other member, whereby to receive a web member loosely therebetween, and means for shifting one of said members toward the other, whereby to deform said resilient portions and pinch said web member between said rotary members.

References Cited in the file of this patent

UNITED STATES PATENTS

| | | |
|---|---|---|
| 419,540 | McMains | Jan. 14, 1890 |
| 663,944 | Tilden | Dec. 18, 1900 |
| 963,828 | Swift | July 12, 1910 |
| 2,346,194 | Sjostrom | Apr. 11, 1944 |
| 2,624,574 | Camras | Jan. 6, 1953 |